Patented Apr. 27, 1948

2,440,436

UNITED STATES PATENT OFFICE 2,440,436

CATALYST CHAMBER CLOSURE

William Hunt Creel, Bartlesville, Okla., assignor to Phillips Petroleum Company, a corporation of Delaware Application January 24, 1946, Serial No. 643,120

3 Claims. (Cl. 23—288)

This invention relates to an improved chamber and closure therefor. In a specific embodiment it relates to a combined inlet and movable closure for a catalyst chamber.

The use of bodies of solid contact material to treat fluids of many kinds is well known. Among the most important commercial processes are to be found those involving the treatment of hydrocarbons and other organic materials. Such treatments may be physical or chemical in nature, or both. For the purpose of illustrating a preferred embodiment, the present invention will be described with particular reference to a catalyst chamber adapted to the catalytic cracking of hydrocarbons. Application of the same chamber or obvious modifications thereof to other hydrocarbon conversions or treatments, or the conversion or treatment of other fluids, will be obvious to one skilled in the art.

In the catalytic conversion of hydrocarbons at elevated temperatures it is highly important that the hydrocarbon reactants be brought into contact with the catalyst as soon as possible after being raised to conversion temperature. For example, the cracking of hydrocarbon oils may be carried out at temperatures of 750 to 1250° F., or even higher. Non-catalytic cracking occurs readily at such temperatures, and any appreciable delay between heating and contacting with catalyst permits such non-catalytic or thermal cracking to proceed to a substantial extent. In many instances this is undesirable due to production of products different from those resulting from the catalytic reaction, and also due to coking with consequent plugging and fouling of transfer lines and other equipment.

It is an object of the present invention to provide a structure adapted for leading heated reactants into a catalyst chamber for immediate contact with catalyst therein. Another object of the invention is to provide such a structure in the form of a removable plug which by its removal facilitates filling and emptying chambers of the catalyst. Yet another object is to provide fluid inlet means adapted to effect even distribution of fluids over a large area of the catalyst mass. A still further object is to provide an insulated fluid inlet means and distributing means. Yet a further object is to provide a catalyst chamber and combined plug-inlet structure capable of attaining the foregoing objects and having high structural strength. Further objects and advantages of the invention will be apparent, to one skilled in the art, from the accompanying disclosure and discussion.

Figure 1:
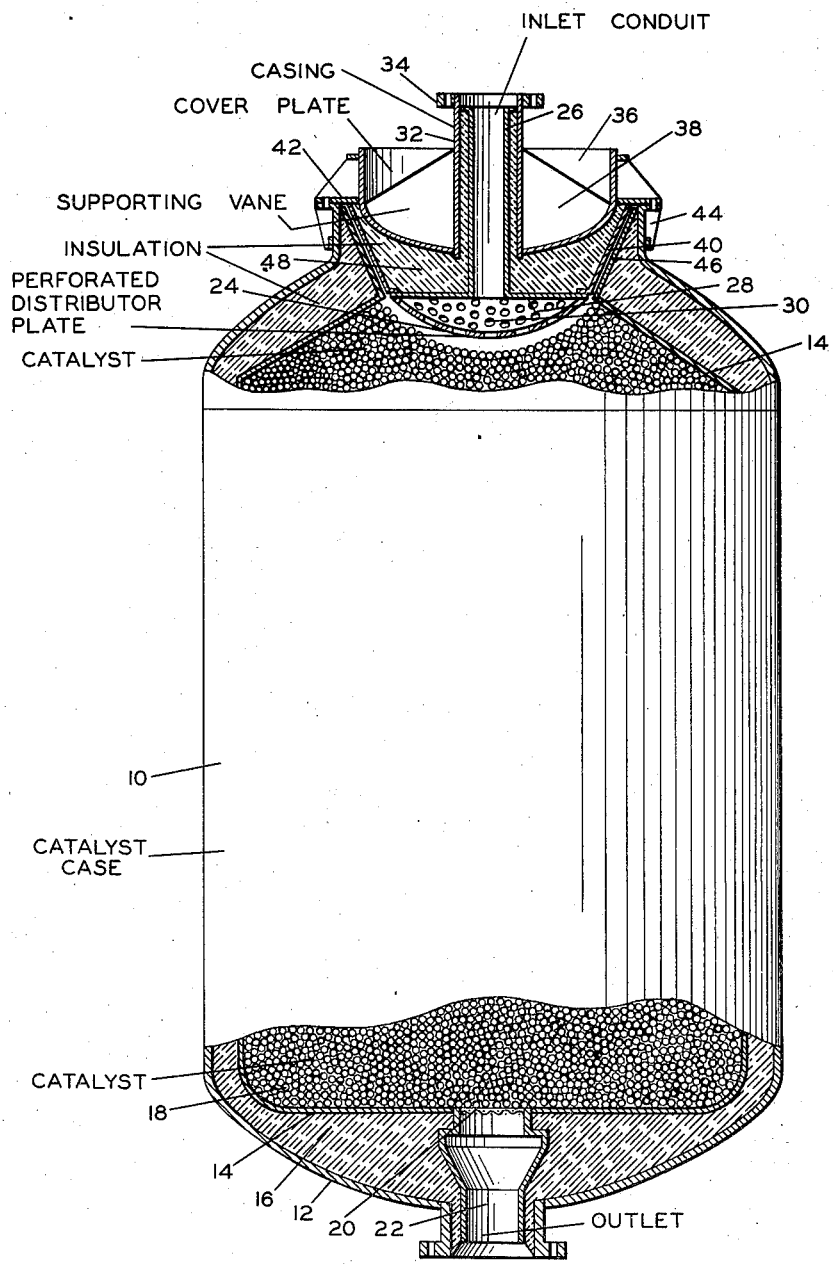
Figure 2:
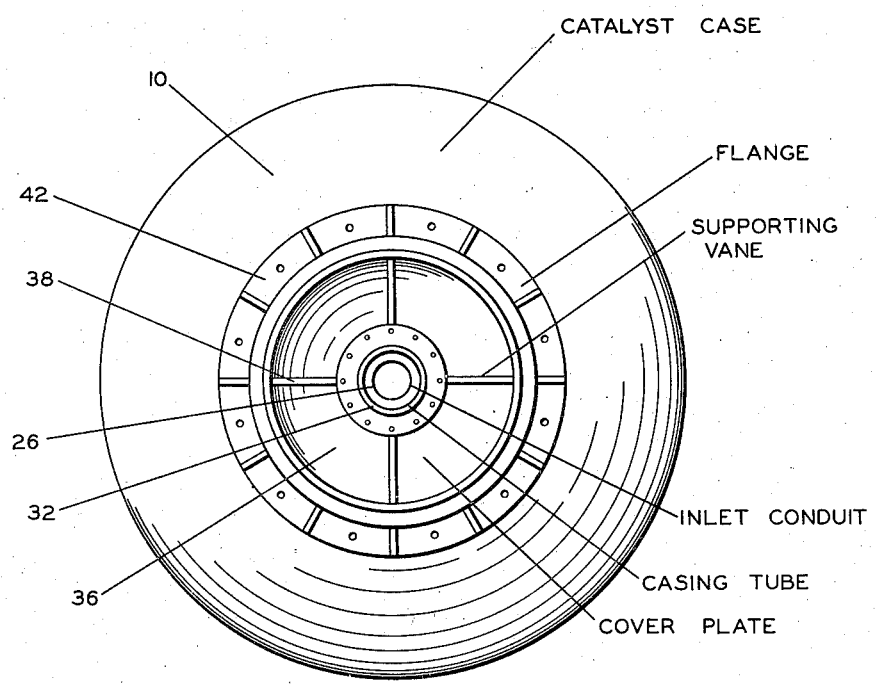

The drawings show one preferred embodiment of my invention. Figure 1 is a partially cut-away view in side elevation of a catalyst chamber with its combined head and inlet means. Figure 2 is a plan view of the same, looking downward on the top.

In the drawings, where like numerals are employed to designate like parts, a catalyst case 10 is shown, comprising an outer shell 12, an inner liner 14, and heat insulating material 16 in the space therebetween. If desired, the insulating material may be made of a self-supporting cement, such as, "Insulcrete," "Insulag," or other refractory material, whereby the inner liner 14 may be dispensed with altogether. The chamber 10 contains a bed of catalyst 18. The catalyst is supported by the bottom of the chamber and by the screen 20 which protects the fluid outlet 22 from stoppage by catalyst particles. The catalyst bed extends at the top into close proximity or contact with the convex perforated distributor plate 24 which forms a part of the inlet head structure of this invention. In addition to the convex distributor plate, the structure comprises an inlet conduit 26 terminating at its inner end in a horizontal annular plate 28. Plate 28 and distributor plate 24 are joined at their periphery, forming a small space 30 through which fluid reactants or regeneration gases flow prior to passing through the perforations of plate 24 into contact with the catalyst. This particular structure insures a minimum time lag between introduction of hot fluids by means of inlet conduit 26 and the contact of such fluids with catalyst, and yet the fluids are caused to enter the catalyst bed over a large upper surface to insure adequate and uniform distribution into the catalyst.

Inlet conduit 26 is surrounded by an outer tubular casing 32 which is somewhat shorter than conduit 26. The latter is joined to casing 32 at the upper end of each and the whole is provided with a suitable flange 34 for connection to the source of hot fluids. Connected to the bottom of casing 32 is an annular convex cover plate 36 which, as shown in the drawing, curves outwardly and upwardly from its connection with tube 32 and terminates in a substantially cylindrically shaped skirt portion. Radial vanes 38 form a supporting interconnection between casing 32 and convex plate 36. Connecting the outer edges of distributor plate 24 and horizontal plate 28 with the outer portion of the structure is an annular frustro-conical shell member 40. This is attached to cover plate 36, or to the flange 42 which serves to join the entire structure with the catalyst case 10 by suitable connection with flange 44 attached to the case 10. Corresponding to shell member 40 is a similar member 46 of catalyst case 10, defining an opening in the case into which the inlet-head member is adapted to fit. The head may be pulled tight to withstand pressure in the catalyst chamber, and suitable gaskets may be used if desired or necessary.

The head-inlet structure is internally insulated by material 48, which may be asbestos, "Sil-O-Cel," or any other of the known insulating materials. This insulation fills the space between cover plate 36, plate 28 and shell 40, as well as the annular space between inner conduit 26 and outer casing 32. By virtue of the structure of the catalyst chamber head allowing for its internal insulation in this manner, it will be apparent that practically no loss in temperature is experienced by the hot gases flowing into conduit 26, and that they begin passage through the bed of catalyst almost intsantaneously. Accordingly, there is no opportunity for appreciable thermal cracking to occur.

The particular structure described makes the filling and emptying of the catalyst case very simple. The bolts or other means holding flange 42 to flange 44 are loosened, the entire head is removed, and catalyst is withdrawn by any suitable means. Ordinarily the head is at the top of the chamber and a suction tube is employed for withdrawing the used catalyst. Fresh catalyst is poured into the large opening and the head then replaced. The head may also be at the side or bottom of the chamber, and catalyst may be dumped out by suction or by tilting the chamber in the one case, or merely by pulling the plug from the bottom and allowing catalyst to run out. The latter requires an additional filling opening in the upper part of the chamber.

In the cracking of hydrocarbons or other high temperature conversions of organic materials, carbonaceous material accumulates on the catalyst after period of use, and the catalyst is regenerated by passing a stream of hot oxygen-containing gas through the catalyst bed. This gas may be introduced either through the inlet conduit 26 or it may be passed through in a direction opposite to the flow of reactants by entering through conduit 22 and exiting through conduit 26.

It will be obvious that the structure described herein may be used not only for catalytic cracking of hydrocarbons, but likewise for many other treatments of fluids with solids, particularly those carried out at high temperatures.

I claim:

1. A combination inlet and closure structure for a catalyst case or the like comprising an inlet conduit forming a central vertical axis for the structure, a concentric casing tube around all said inlet conduit except the lower end thereof and joined to the upper end thereof, radial supporting vanes extending outwardly from said casing in planes passing through the axis of the structure, a convex plate extending outwardly and upwardly from the edge of the lower end of said casing and supported by said vanes along its upper surface, a horizontal circular plate extending outwardly from the lower end of said inlet conduit, an inverted frustro-conical annular shell connecting the outer edge of said horizontal plate with said convex plate, heat-insulating material filling the space bounded by said inlet conduit, casing, convex plate, shell and horizontal plate, and a convex perforated distributor plate attached to the outer edge of said horizontal plate adapted to allow flow of incoming fluid from said inlet through the perforations of said distributor plate.

2. A catalyst chamber inlet and head comprising an inlet structure in the shape of an inverted mushroom, the lower convex portion thereof being perforated, an annular shell attached to the outer edge of said portion, said shell being inverted frusto-conical in shape and extending upwardly from said edge and adapted to seat in a corresponding opening in the catalyst chamber, and heat-insulating material filling the space formed between said shell and said inlet structure.

3. In combination, a catalyst chamber comprising an inner shell and an outer shell, heat-insulating material in the space between said shells, a frustro-conical shaped ring connecting said inner and outer shells and forming a circular opening in said chamber; a plug-inlet structure adapted to seat in said opening comprising a frustro-conical annular shell corresponding to said opening, a convex perforated inlet plate closing the inner end of said shell; a convex outer casing with a substantially cylindrical skirt of diameter intermediate the minimum and maximum diameters of said shell and attached to the outer edge of said shell, an outer tube fitting into a central opening in said casing, an inner tube within said outer tube fastened thereto along the free edge thereof, a circular plate connecting the edge of the inner end of said inner tube with the outer edge of said convex perforated inlet plate forming a space between the two said plates continuous with the interior of said inner tube, heat-insulating material filling the void between said shell, casing, outer tube, inner tube and circular plate, radial supporting vanes attached to said outer tube and said outer casing, a flange attached to and around said outer casing and said frustro-conical shell; means on the outer shell of said catalyst chamber around the opening therein adapted to cooperate with said flange to hold said plug-inlet structure in place; a body of catalyst within said catalyst chamber extending substantially into contact with said convex perforated inlet plate; the whole being arranged so that fluid introduced through said inner tube passes therefrom through said space between said plates and through said perforated plate immediately into contact with said catalyst.

WILLIAM HUNT CREEL.